United States Patent
Ho et al.

(10) Patent No.: US 6,564,333 B1
(45) Date of Patent: May 13, 2003

(54) PERIPHERAL DEVICE POWER MANAGEMENT CIRCUIT AND METHOD FOR SELECTING BETWEEN MAIN AND AUXILIARY POWER SOURCES OR FROM THIRD POWER SOURCE

(75) Inventors: Tan Thanh Ho, Santa Clara, CA (US); Scott William Mitchell, San Jose, CA (US); Ryan Hirth, Windsor, CA (US); Ngo Thanh Ho, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/454,468

(22) Filed: Dec. 3, 1999

(51) Int. Cl.$^7$ ................................................. G06F 1/26
(52) U.S. Cl. ...................................... 713/340; 713/310
(58) Field of Search ................................ 307/130, 140; 713/340, 310

(56) References Cited

U.S. PATENT DOCUMENTS

| | | | | |
|---|---|---|---|---|
| 5,436,487 A | * | 7/1995 | Narita | 257/378 |
| 5,739,597 A | * | 4/1998 | Bailey et al. | 307/140 |
| 6,091,617 A | * | 7/2000 | Moran | 363/142 |
| 6,327,635 B1 | * | 12/2001 | Alston et al. | 365/226 |
| 6,393,570 B1 | * | 5/2002 | Henderson et al. | 713/310 |
| 6,404,077 B1 | * | 6/2002 | Moran | 307/87 |
| 6,438,429 B1 | * | 8/2002 | Ho et al. | 700/22 |

OTHER PUBLICATIONS

Advanced Micro Devices, "Magic Packet Adapter Card Implementation", Application Note, PID#21385A, Sep. 1997.*

Advanced Micro Devices, "Implementation of Magic Packet–ready Motherboard", Application Note, PID#21383B, Apr. 1997.*

* cited by examiner

Primary Examiner—Thomas Lee
Assistant Examiner—Albert Wang
(74) Attorney, Agent, or Firm—Wagner, Murabito & Hao LLP

(57) ABSTRACT

A circuit and method thereof for arbitrating between a first power source and a second power source in a computer system peripheral device such as a network adapter (e.g., a network interface card) that is connected to multiple power sources. The circuit includes a field effect transistor (FET) and a diode integral with the FET coupled between the first power source and the second power source. The FET is adapted to conduct current from the second power source when power is not available from the first power source, and to substantially prevent current from flowing from the first power source to the second power source. The circuit also includes a voltage regulator coupled between the first power source and the second power source, adapted to regulate voltage such that a voltage from the first power source and a voltage from the second power source are approximately equal.

19 Claims, 6 Drawing Sheets

PERIPHERAL DEVICE POWER MANAGEMENT CIRCUIT AND METHOD FOR SELECTING BETWEEN MAIN AND AUXILIARY POWER SOURCES OR FROM THIRD POWER SOURCE

TECHNICAL FIELD

The present invention generally pertains to the field of computer networking. More particularly, the present invention pertains to power management in a network adapter with more than one power source, such as a network adapter equipped with remote wakeup capability.

BACKGROUND ART

A computer system's functionality is dramatically enhanced by coupling stand-alone computers together to form a computer network. In a computer network, users may readily exchange files, share information stored on a common database, pool resources, and communicate via e-mail and video teleconferencing. Another advantage of computer networks is that they can be accessed from remote locations via a modem or various other types of communication equipment.

One popular type of computer network is known as a local area network (LAN). LANs connect multiple computers together such that the users of the computers can access the same information and share data. Typically, in order to be connected to a LAN, a general purpose computer requires a peripheral device generally known as a network adapter or network interface card (NIC). Essentially, the NIC works with the operating system and central processing unit (CPU) of the host computer to control the flow of information over the LAN. NICs may also be used to connect a computer to the Internet.

Remote access to a computer network (e.g., a LAN) is facilitated by providing the capability to start or wake up a computer from a remote location. This feature is advantageous to a user desiring access to a computer from a remote location. This feature is also advantageous to a network administrator, allowing the administrator to perform, for example, maintenance activities on a computer system from a remote location.

A standard has been developed for allowing a networked computer which is in sleep mode to be awakened. More specifically, Advanced Micro Devices (AMD) of Santa Clara, Calif., has developed a technology referred to as the Magic Packet technology. In the Magic Packet technology, assuming, for example, that an Ethernet controller is running and communicating with the network, the computer's power management hardware or software puts the Ethernet controller into the Magic Packet mode prior to the system going to sleep. Once in the sleep mode, the computer will be awakened when a Magic Packet is detected. That is, incoming data will be monitored until the specific sequence comprising the Magic Packet is detected. The Magic Packet technology and the associated standard (generally referred to as the Wakeon LAN standard) are well known in the art.

Accordingly, some NICs are designed to detect a Magic Packet and to awaken the computer (or selected components within the computer) in response. These NICs are typically connected in a standard fashion to the computer (e.g., to the computer's motherboard) via a bus such as a PCI (peripheral component interconnect) bus. These NICs also are connected to the motherboard via a separate cable (e.g., a remote wakeup cable). Thus, NICs that provide a remote wakeup capability typically have a primary power source from the motherboard and an auxiliary power source from the remote wakeup cable. When the computer is powered on and awake, power to the NIC is provided over the PCI bus from the primary power source, typically five volts (5V). When the computer system is in the sleep mode, power to the NIC is provided over the remote wakeup cable from the auxiliary power source, typically also 5V. Therefore, when a Magic Packet is received, the NIC will have power and hence the ability to wake up. The NIC also can then send a PME (power management event) signal via the remote wakeup cable to wake up the computer.

The prior art is problematic because the presence of more than one power source can cause a power contention issue. If power is being provided by one source (for example, by the auxiliary power source), it is not necessary for the other source (in this case, the primary power source) to provide power. In fact, using power concurrently from both sources may cause damage to some of the components in the NIC. Also, switching to different power sources during the power down mode can cause faults in the NIC.

This problem is aggravated by introduction of revision 2.2 of the PCI specification ("PCI 2.2"). With PCI 2.2, the aforementioned PCI bus is required to provide another auxiliary power source in addition to the power sources described above. In accordance with PCI 2.2, pin A14 of the PCI bus provides a 3.3V auxiliary power source to the NIC. Thus, a NIC with the remote wakeup capability and compliant with PCI 2.2 can have three power sources, aggravating the power contention issue described above.

Thus, a need exists for a device or method that addresses the power contention problem so that components do not inadvertently receive power from more than one source when multiple power sources are present in a peripheral device (such as a NIC). A further need exists for a device or method that addresses the above need and allows the peripheral device to select one power source versus another depending on the mode in which the computer and peripheral device are currently operating (e.g., sleep mode versus awake). The present invention provides a novel solution to these needs.

DISCLOSURE OF THE INVENTION

The present invention provides a device and method thereof which address the power contention problem so that components do not inadvertently receive power from more than one source when multiple power sources are present in a peripheral device (such as a network interface card). The present invention also provides a device and method thereof that allow the peripheral device to select one power source versus another depending on the mode in which the computer and peripheral device are currently operating (e.g., sleep mode versus awake).

Specifically, in one embodiment of the present invention, a circuit and method thereof are used to arbitrate between a first power source and a second power source in a computer system peripheral device such as a network adapter (e.g., a network interface card) that is connected to multiple power sources. In the present embodiment, the circuit includes a first component coupled between the first power source and the second power source. The first component is adapted to conduct current from the second power source when power is not available from the first power source. Integral with the first component is a second component adapted to substantially prevent current from flowing from the first power source to the second power source. In the present embodiment, the first component is a field effect transistor (FET) and the second component is a diode intrinsic to the FET. The circuit also includes a third component coupled between the first power source and the second power source. The third component is adapted to regulate voltage such that a voltage from the first power source and a voltage from the second power source are approximately equal.

In one embodiment, the first power source is selected from a primary power source and a first auxiliary power source that are connected to the peripheral device. In this case, the second power source is a second auxiliary power source also connected to the peripheral device. In this embodiment, a fourth component is coupled between the primary power source and the first auxiliary power source. The fourth component is adapted to conduct current from the primary power source when power is not available from the first auxiliary power source. Integral with the fourth component is a fifth component adapted to conduct current from the primary power source in combination with the fourth component and to substantially prevent current from flowing from the first auxiliary power source to the primary power source. In the present embodiment, the fourth component is a FET and the fifth component is a diode intrinsic to the FET. Thus, in this embodiment, power from the first auxiliary power source is used when power is available from the first auxiliary power source, and otherwise power from the primary power source is used.

In one embodiment, the primary power source is a five volt (5V) source connected to the peripheral device via a peripheral component interconnect (PCI) bus, the first auxiliary power source is a 5V source connected to the peripheral device via a remote wakeup cable, and the second auxiliary power source is a 3.3V source connected to the peripheral device in accordance with PCI specification revision 2.2.

Thus, the present invention provides a circuit and method thereof for arbitrating between multiple power sources connected to a peripheral device. The FETs are used to select one of the power sources and permit switching from one power source to another depending on the mode of operation. The diodes intrinsic to the FETs provide protection against back drive current.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
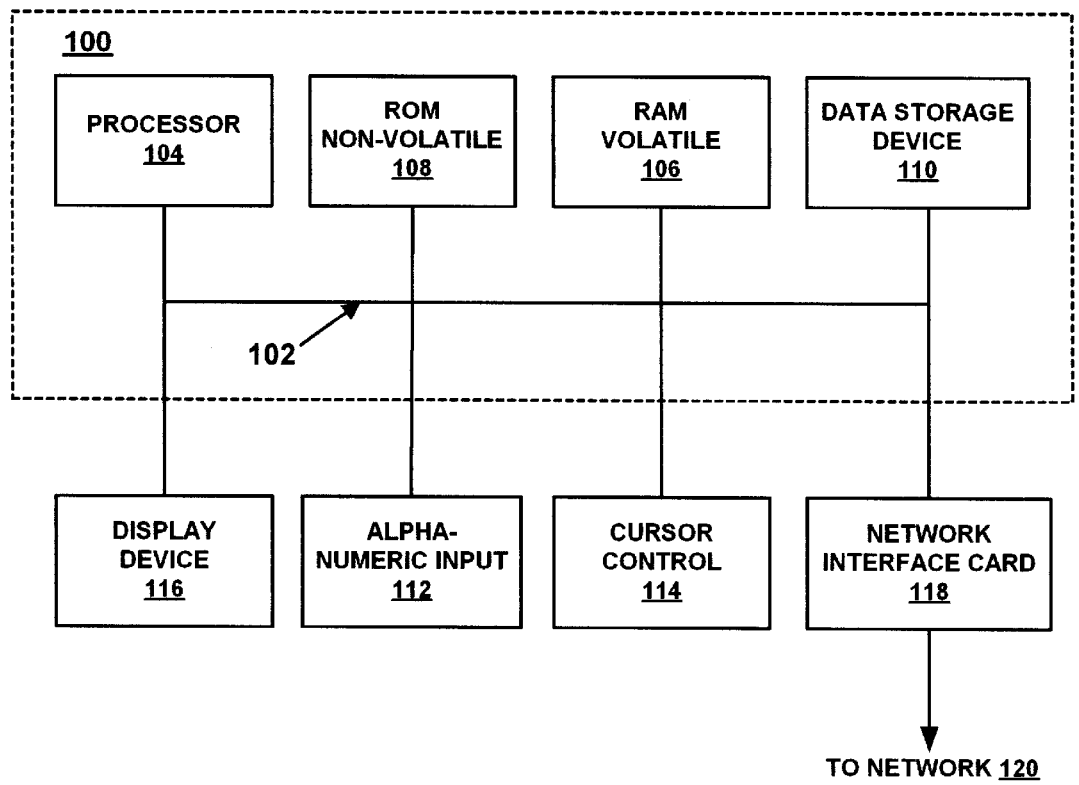
FIG. 1 is a block diagram of an exemplary computer system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," "conducting," "using," "arbitrating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

FIG. 1 illustrates an exemplary computer system 100 upon which embodiments of the present invention may be implemented. The computer system 100 is used in combination with a peripheral component to perform the present method in accordance with one embodiment of the present invention. It is appreciated that system 100 is exemplary only and that the present invention can operate within a number of different computer systems including general purpose networked computer systems, embedded computer systems, and stand alone computer systems. Additionally, computer system 100 is well adapted to having computer readable media such as, for example, a floppy disk, a compact disc, and the like coupled thereto. Such computer readable media is not shown coupled to computer system 100 in FIG. 1 for purposes of clarity.

Computer system 100 includes an address/data bus 102 for communicating information. In the present embodiment, bus 102 is a PCI (peripheral component interconnect) bus compliant with revisions 2.1 and 2.2 of the PCI specification. Accordingly, the discussion herein is in the context of a PCI bus; however, it is appreciated that various other types of buses can be used in accordance with the present invention. It is also appreciated that other revisions of the PCI specification may be utilized in accordance with the present invention. Additional information regarding bus 102 is provided below in conjunction with FIG. 3.

Continuing with reference to FIG. 1, central processor unit 104 is coupled to bus 102 for processing information and instructions. Computer system 100 can also include data storage features such as a computer usable volatile memory 106 (e.g., random access memory [RAM]) coupled to bus 102 for storing information and instructions for central processor unit 104, computer usable non-volatile memory 108 (e.g. read only memory [ROM]) coupled to bus 102 for storing static information and instructions for the central processor unit 104, and a data storage device 110 (e.g., a magnetic or optical disk and disk drive) coupled to bus 102 for storing information and instructions. Computer system 100 can also include an optional alphanumeric input device 112 including alphanumeric and function keys. Alphanumeric input device 112 is coupled to bus 102 for communicating information and command selections to central processor unit 104. Computer system 100 can also optionally include a cursor control device 114 coupled to bus 102 for communicating user input information and command selections to central processor unit 104. Computer system 100 also can include an optional display device 116 coupled to bus 102 for displaying information.

Optional display device 116 may be a liquid crystal device, cathode ray tube, or other display device suitable for creating graphic images and alphanumeric characters recognizable to a user. Optional cursor control device 114 allows the computer user to dynamically signal the two-dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well-suited to directing a cursor by other means such as, for example, voice commands.

With reference still to FIG. 1, significantly, a network interface card (NIC) 118 coupled to bus 102 is connected to a network 120 and controls the flow of information to and from NIC 118 over network 120. Incoming data packets arrive at NIC 118 via network 120 and are typically stored in memory of NIC 118 before being transferred to other hardware and software of computer system 100. In accordance with the present invention, NIC 118 is equipped with a remote wakeup function. Various known remote wakeup techniques may be used in accordance with the present invention. One such remote wakeup technique is the known Magic Packet technique utilizing the Wakeon LAN (local area network) standard. A more detailed discussion of NIC 118 in furtherance of the present invention is found below.

Figure 2:
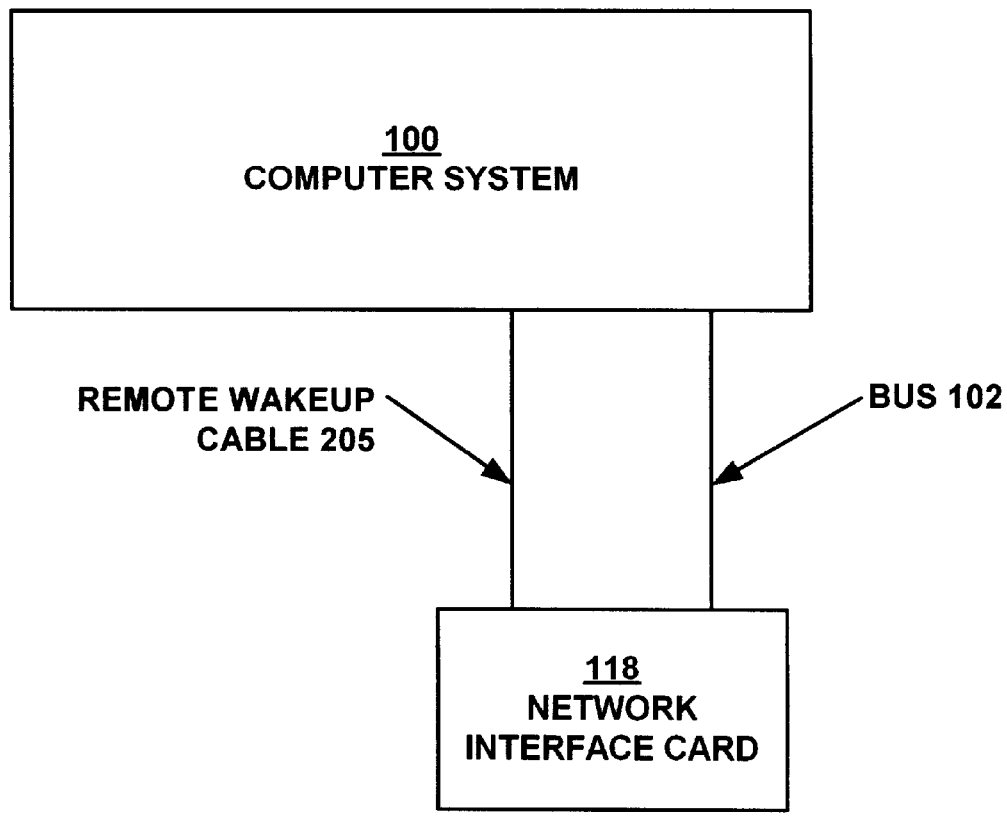
FIG. 2 is a block diagram showing a network interface card with remote wakeup capability connected to the computer system of FIG. 1 in accordance with one embodiment of the present invention.

Refer next to FIG. 2, which is a block diagram showing NIC 118 (with remote wakeup capability) connected to computer system 100 in accordance with the present embodiment of the present invention. NIC 118 is coupled to computer system 100 via bus 102 as described above. In one embodiment in which NIC 118 has remote wakeup capability, NIC 118 is also coupled to computer system 100 via remote wakeup cable 205.

In the present embodiment, bus 102 provides five volts (+5V) of power to NIC 118; in the discussion herein, this power is referred to as "primary power" or "+5V primary." The primary power is used to power NIC 118 when, for example, computer system 100 is powered on and not in the sleep mode, or when remote wakeup cable 205 is not attached.

When the remote wakeup function is present, +5V is also provided to NIC 118 using remote wakeup cable 205; in the discussion herein, this is referred to as "first auxiliary power" or "+5V auxiliary." The first auxiliary power is used to power NIC 118 when it is available. In other words, +5V auxiliary power supersedes the +5V primary power, and continues to be available when computer system 100 is in the sleep mode. In this manner, power remains available to NIC 118 so that it has the capability to wake up upon receiving a particular signal (e.g., a Magic Packet).

Additional auxiliary power of +3.3V can also be provided to NIC 118 via bus 102. For example, revision 2.2 of the PCI specification requires that +3.3V of auxiliary power be provided via pin A14 of bus 102. In the discussion herein, this is referred to as "second auxiliary power" or "+3.3V auxiliary." The +3.3V auxiliary power is not used if the +5V auxiliary power provided by the remote wakeup cable is available; that is, +3.3V auxiliary power is only used when computer system 100 is powered down without +5V auxiliary power.

Thus, NIC 118 has multiple power sources: for bus 102 compliant with revision 2.1 of the PCI specification ("PCI 2.1"), NIC 118 (with remote wakeup capability) has at least two (2) power sources, and for bus 102 compliant with revision 2.2 of the PCI specification, NIC 118 (with remote wakeup capability) has three (3) power sources. It is appreciated that additional power sources, or power sources of different voltages, may be utilized in accordance with the present invention. It is further appreciated that the present invention may be used when the remote wakeup cable is not present for PCI 2.1 or when the system is not compliant with revision 2.2 of the PCI specification, as will be seen. Thus, the present invention can be utilized with legacy devices.

Figure 3:
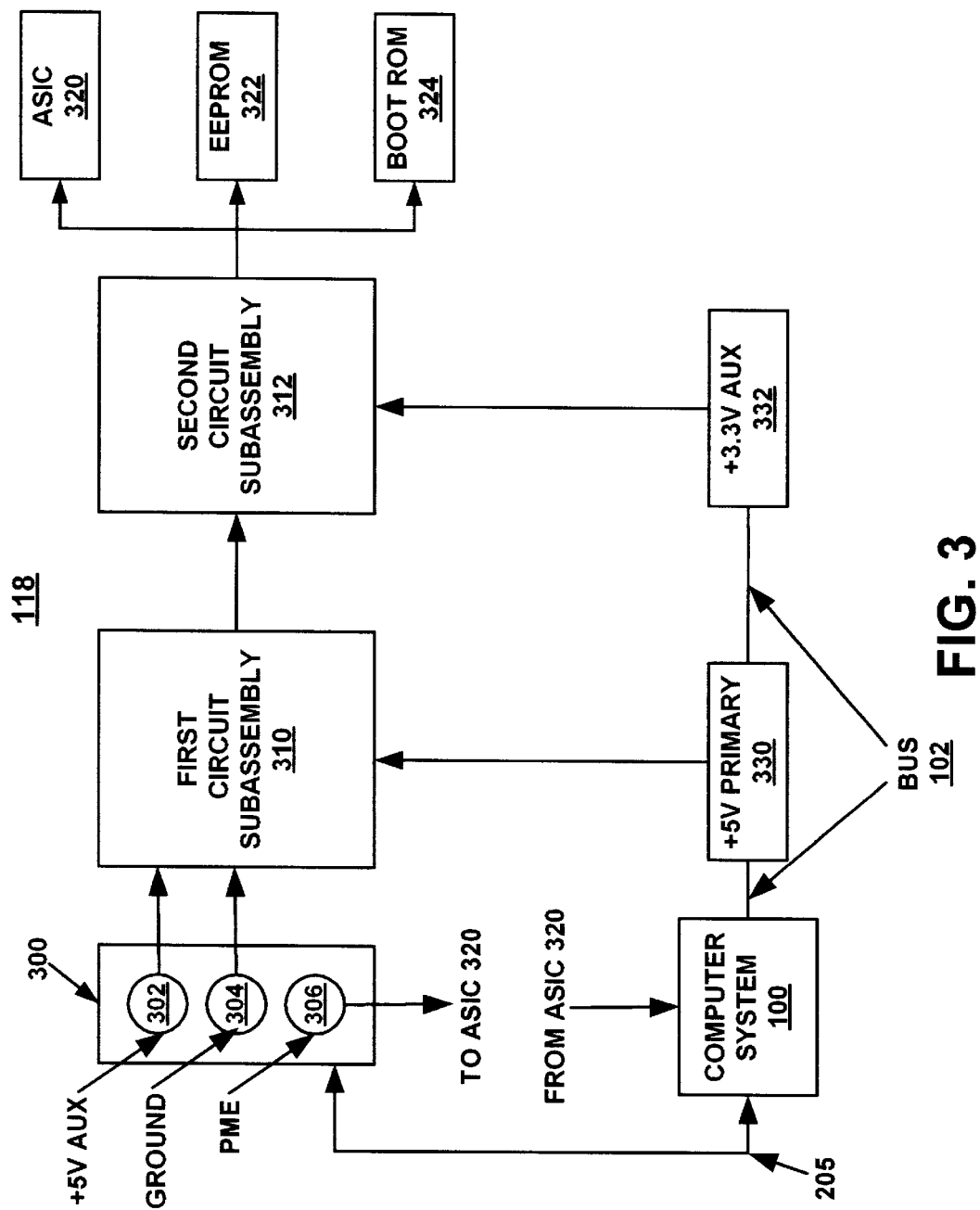
FIG. 3 is a block diagram of the network interface of FIG. 2 in accordance with one embodiment of the present invention.

FIG. 3 is a block diagram providing further details of NIC 118 in accordance with the present embodiment of the present invention. As described above, +5V primary power (330) and +3.3V auxiliary power (332) are provided to NIC 118 from computer system 100 via bus 102 for a system compliant with revision 2.2 of the PCI specification.

Also as described above, power for the remote wakeup function is provided to NIC 118 via remote wakeup cable 205. Remote wakeup cable 205 is connected to NIC 118 using connector 300. In the present embodiment, connector 300 is a 3-pin plug comprised of a first pin 302, a second pin 304 and a third pin 306. In this embodiment, first pin 302 provides +5V auxiliary power to NIC 118. Second pin 304 is a ground, and third pin 306 provides a power management event (PME) signal that is used to wake up computer system 100. In the present embodiment, third pin 306 (PME) is connected to application specific integrated circuit (ASIC) 320, which is prompted to wake up computer system 100 when NIC 118 receives a wakeup signal (such as a Magic Packet) (the connections from third pin 306 to ASIC 320 and from ASIC 320 to computer system 100 are not shown).

In accordance with the present invention, NIC 118 also includes first circuit subassembly 310 and second circuit subassembly 312 that are used for arbitrating between multiple power sources connected to NIC 118, thereby addressing power contention issues. First circuit subassembly 310 and second circuit subassembly 312 are described below in conjunction with FIG. 4 and FIG. 5, respectively. In addition to ASIC 320, NIC 118 can also include electrically erasable programmable ROM (EEPROM) 322 and boot ROM 324.

Figure 4:
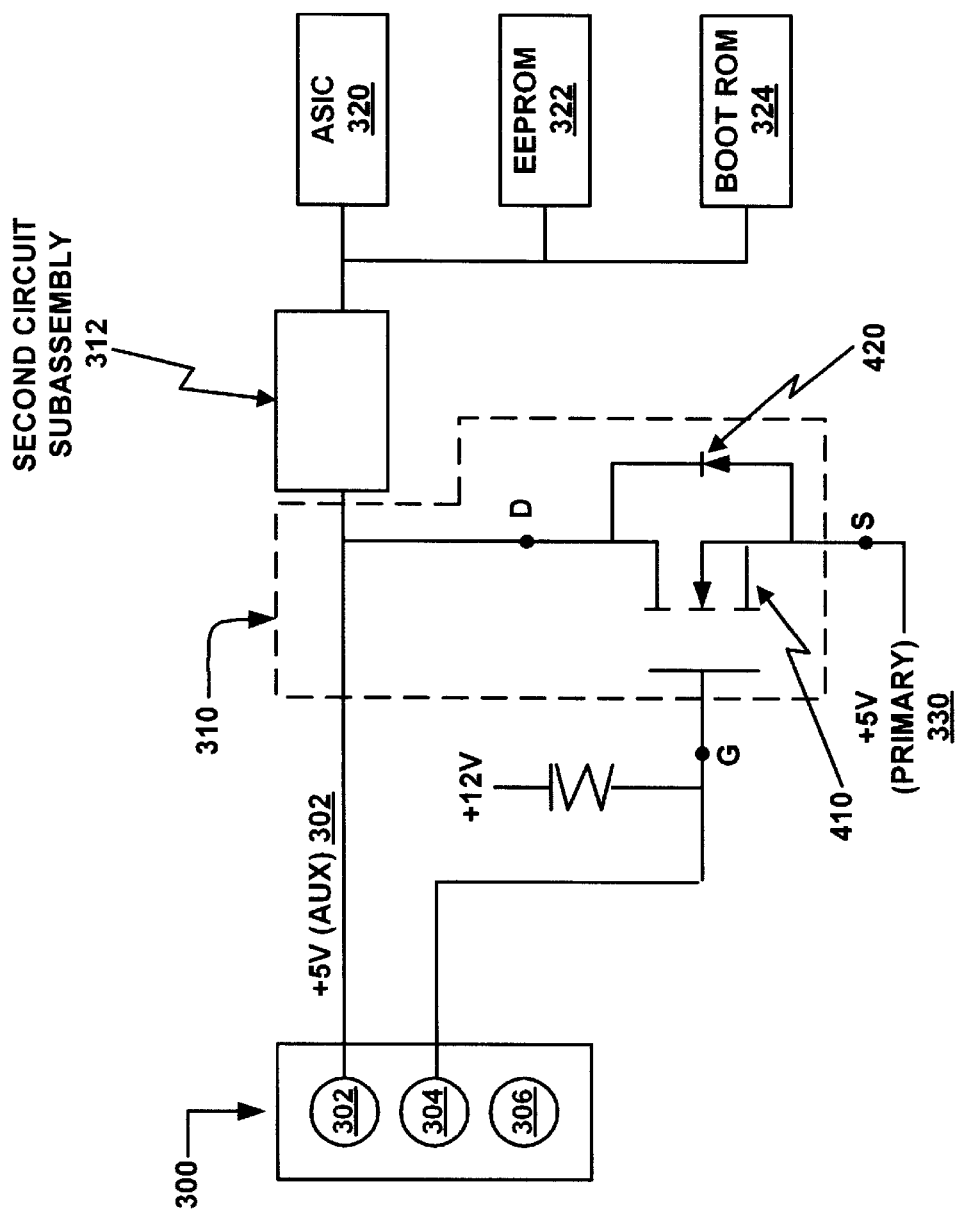
FIG. 4 is a schematic diagram of a first circuit subassembly used by the network interface card of FIG. 3 in accordance with one embodiment of the present invention.

FIG. 4 is a schematic diagram illustrating first circuit subassembly 310 in accordance with one embodiment of the present invention. First circuit subassembly 310 receives either +5V primary power 330 from bus 102 (FIG. 3) or +5V auxiliary power 302 from remote wakeup cable 205 (FIG. 3). In accordance with the present invention, first circuit subassembly 310 passes power from one source or the other but not both to second circuit subassembly 312, thereby addressing the potential power contention issue that would otherwise occur. In the present embodiment, first circuit subassembly 310 conducts the power from +5V auxiliary power 302 when that source of power is available (e.g., when NIC 118 has the remote wakeup function) even when +5V primary power 330 is available. If +5V auxiliary power 302 is not available (e.g., NIC 118 does not have the remote wakeup function), then +5V primary power 330 is used (when computer system 100 is powered on and not in the sleep mode).

Continuing with reference to FIG. 4, first circuit subassembly 310 includes a component (410) that conducts power (e.g., current) from +5V primary power 330 when +5V auxiliary power 302 is not present. In the present embodiment, component 410 is a transistor, specifically a n-channel field effect transistor (FET) (hereinafter, n-channel FET 410). Intrinsic to n-channel FET 410 is a diode 420. The orientation of n-channel FET 410 allows the intrinsic diode 420 to substantially prevent power (current) from flowing from +5V auxiliary power 302 (when present) to +5V primary power 330. In the present embodiment, n-channel FET 410 is designed such that when $V_{GS}$ is greater than or equal to +5V, then n-channel FET 410 is on; otherwise, it is off. It is appreciated that n-channel FET 410 can be designed to be on/off for other values of $V_{GS}$ in accordance with the present invention.

In accordance with the present embodiment of the present invention, first circuit subassembly 310 works as follows. In the case in which both +5V auxiliary power 302 and +5V primary power 330 are present, NIC 118 will have remote wakeup capability and, accordingly, connector 300 including second pin 304 (ground) is also present. Thus, the +12 V source (from bus 102) is grounded and $V_{GS}$ is −5V (0 V at the gate [G] terminal and +5V at the source [S] terminal of n-channel FET 410). Consequently, n-channel FET 410 is off and power from +5V auxiliary power 302 is used to power ASIC 320. Diode 420 intrinsic to n-channel FET 410 protects +5V primary power 330 against back drive current from +5V auxiliary power 302.

In the case in which computer system 100 (FIG. 3) is powered down (e.g., the computer system is in the sleep mode), then only +5V auxiliary power 302 is available. As can be seen from FIG. 4, this power is provided to ASIC 320 directly, and no power will be available from +5V primary power 330. Diode 420 intrinsic to n-channel FET 410 protects +5V primary power 330 against back drive current from +5V auxiliary power 302.

In the case in which only +5V primary power 330 is present, NIC 118 does not have remote wakeup capability, and so connector 300 including second pin 304 (ground) is not present. Thus, $V_{GS}$ is +7V and consequently n-channel FET 410 is on. Power from +5V primary power 330 is then used to power ASIC 320. In this manner, the present invention can be implemented with legacy devices not equipped with the remote wakeup function.

In summary, in the present embodiment of the present invention, first circuit subassembly 310 gives precedence to +5V auxiliary power 302 when that source of power is available, and otherwise uses power from +5V primary power 330 when that source of power is available. However, it is appreciated that in other embodiments a different order can be utilized when assigning precedence of one power source over another.

Figure 5:
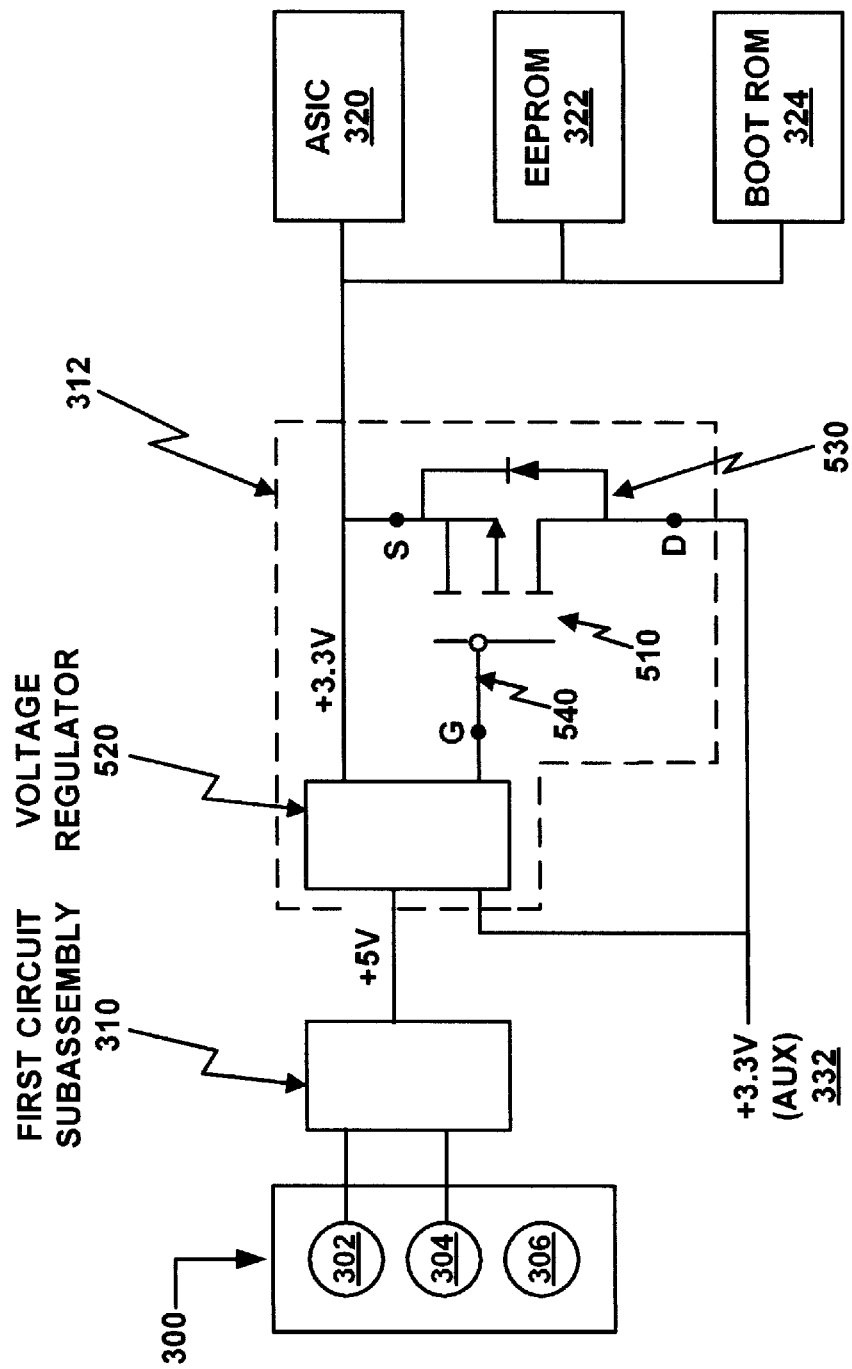
FIG. 5 is a schematic diagram of a second circuit subassembly used by the network interface card of FIG. 3 in accordance with one embodiment of the present invention.

FIG. 5 is a schematic diagram illustrating second circuit subassembly 312 (including voltage regulator 520) in accordance with one embodiment of the present invention. In the present embodiment of the present invention, voltage regulator 520 is incorporated between first circuit subassembly 310 and the remainder of second circuit subassembly 312. In the present embodiment, voltage regulator 520 steps down the voltage from +5V to +3.3V. Thus, second circuit subassembly 312 receives either +3.3V power from first circuit subassembly 310 or +3.3V auxiliary power 332 from bus 102 (FIG. 3).

Continuing with reference to FIG. 5, the +5V received by voltage regulator 520 from first circuit subassembly 310 can be from either +5V primary power 330 or +5V auxiliary power 302 (see discussion pertaining to FIG. 4). In accordance with the present invention, second circuit subassembly 312 passes either +3.3V power (from first circuit subassembly 310 and voltage regulator 520) or +3.3V auxiliary power 332 to ASIC 320, thereby addressing the potential power contention issue that would otherwise occur. In the present embodiment, second circuit subassembly 312 conducts the +3.3V power from first circuit subassembly 310 and voltage regulator 520 when that source of power is available, even when +3.3V auxiliary power 332 is available. If +3.3V from first circuit subassembly 310 and voltage regulator 520 is not available, then +3.3V auxiliary power 332 is used (when computer system 100 is powered on and not in the sleep mode). Thus, +3.3V auxiliary power 332 is not used if the auxiliary power provided by the remote wakeup function is available; that is, +3.3V auxiliary power 332 is only used when computer system 100 (FIG. 3) is powered down without +5V auxiliary power 302 (FIG. 4).

With reference still to FIG. 5, second circuit subassembly 312 includes a component (510) that conducts power (current) from +3.3V auxiliary power 332 when +3.3V from first circuit subassembly 310 and voltage regulator 520 is not present. In the present embodiment, this component is a transistor, specifically a p-channel field effect transistor (FET) (hereinafter, p-channel FET 510). Intrinsic to p-channel FET 510 is a diode 530. The orientation of p-channel FET 510 allows the intrinsic diode 530 to conduct power from +3.3V auxiliary power 332 when +3.3V (from first circuit subassembly 310) and voltage regulator 520 are not present, and to substantially prevent power (current) from flowing to +3.3V auxiliary power 332. In the present embodiment, p-channel FET 510 is designed such that when $V_{SG}$ is greater than or equal to +2V, then p-channel FET 510 is on; otherwise, it is off. It is appreciated that p-channel FET 510 can be designed to be on/off for other values of $V_{SG}$ in accordance with the present invention.

In accordance with the present embodiment of the present invention, the source (S) terminal of p-channel FET 510 is connected to voltage regulator 520 and the drain (D) terminal is connected to +3.3V auxiliary power 332. In addition, diode 530 intrinsic to p-channel FET 510 is pointed toward voltage regulator 520. Thus, diode 530 intrinsic to p-channel FET 510 protects +3.3V auxiliary power 332 against back drive current from voltage regulator 520. Also, this configuration is advantageous because p-channel FET 510 can switch more quickly and smoothly because the voltage from +3.3V auxiliary power 332 will help stabilize power perturbations.

In accordance with the present embodiment of the present invention, second circuit subassembly 312 works as follows. In the case in which both +3.3V auxiliary power 332 and +3.3V from first circuit subassembly 310 and voltage regulator 520 are present, voltage regulator 520 has a drive signal 540 that drives low when the voltage regulator is no longer in regulation. Drive signal 540 is used to drive high the gate (G) of p-channel FET 510 and thus turn it off. In this case, $V_{SG}$ becomes less than zero volts. Consequently, only power (current) from first circuit subassembly 310 and voltage regulator 520 passes to ASIC 320. Diode 530 intrinsic to p-channel FET 510 protects +3.3V auxiliary power 332 against back drive current.

In the case in which only +3.3V auxiliary power 332 is available and +5V from first circuit subassembly 310 is not available, the drive signal 540 is driven low and $V_{SG}$ becomes +3.3V. Consequently, p-channel FET 510 is on. Thus, power from +3.3V auxiliary power 332 is used to power ASIC 320.

In the case in which only power (current) from first circuit subassembly 310 and voltage regulator 520 is available (e.g., in the case in which the system is not compliant with PCI specification revision 2.2), then this power is used to power ASIC 320. P-channel FET 510 including intrinsic diode 530 protects +3.3V auxiliary power 332 against back drive current. Thus, the present invention can be utilized with legacy devices not compliant with revision 2.2 of the PCI specification.

In summary, in the present embodiment of the present invention, second circuit subassembly 312 gives precedence to +3.3V from first circuit subassembly 310 and voltage regulator 520 when that source of power is available, and otherwise uses power from +3.3V auxiliary power 332 when that source of power is available. Accordingly, +3.3V auxiliary power 332 is only used during power down of computer system 100 (FIG. 3) when +5V auxiliary power 302 is not available. However, it is appreciated that in other embodiments, a different order may be utilized when assigning precedence of one power source over another.

Figure 6:
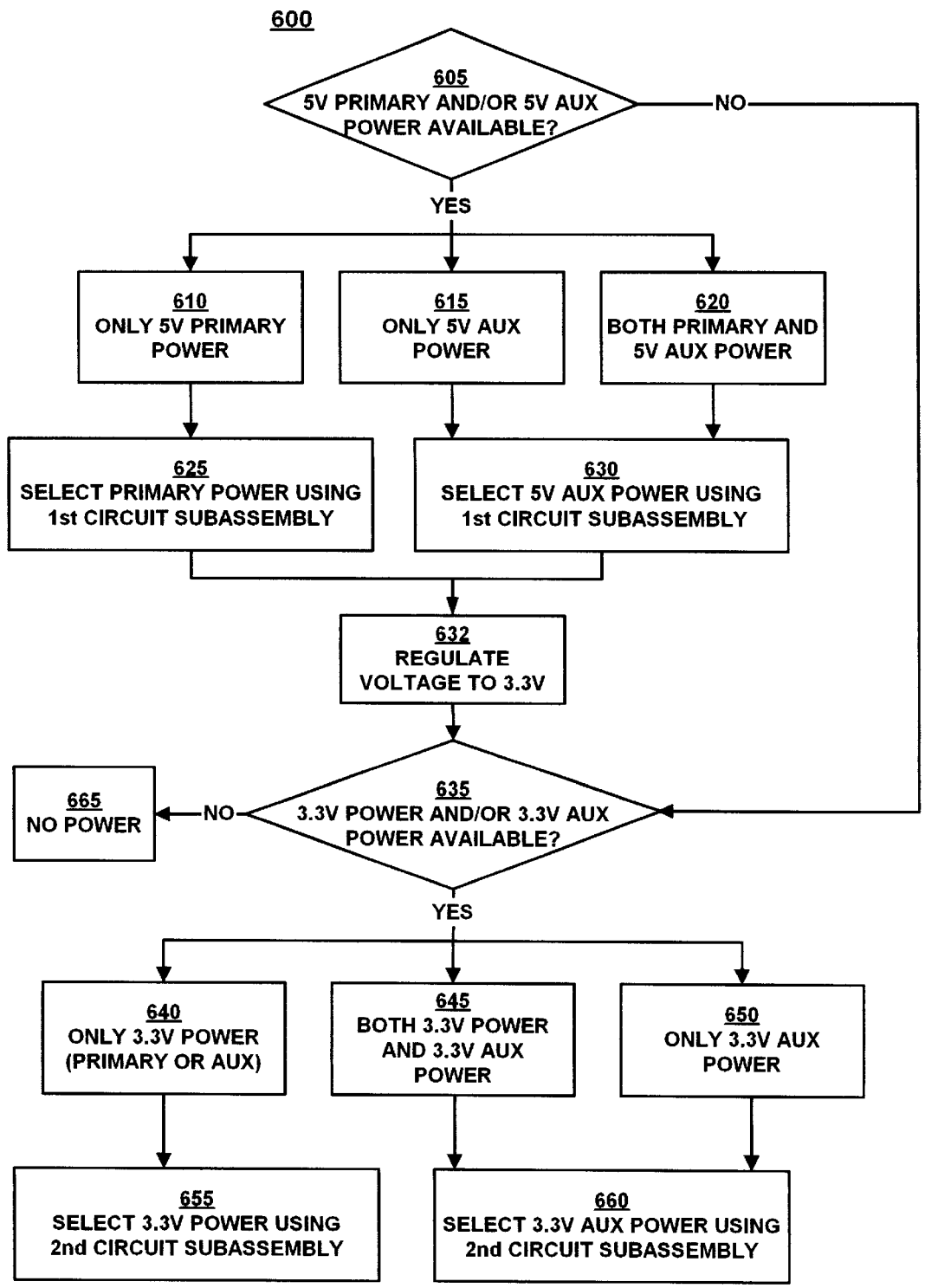
FIG. 6 is a flowchart of a process used to arbitrating between multiple power sources in accordance with one embodiment of the present invention.

FIG. 6 is a flowchart of process 600 used to arbitrate between multiple power sources connected to NIC 118 (FIG. 3) in accordance with one embodiment of the present invention. Process 600 can be implemented for devices (e.g., NIC 118) with or without remote wakeup capability and for devices that are or are not compliant with PCI specification revision 2.2 ("PCI 2.2"). Thus, process 600 can be utilized with legacy devices.

Starting with step 605 of FIG. 6, in accordance with the present embodiment, power will be selectively conducted from either +5V primary power 330 (FIG. 3) or +5V auxiliary power 302 (FIG. 3).

In step 610 of FIG. 6, only +5V primary power 330 is available. In this case, NIC 118 does not have the remote wakeup function through cable 205 (FIG. 3) or, alternatively, cable 205 is not connected to connector 300 of FIG. 3.

In step 615 of FIG. 6, only +5V auxiliary power 302 is available. In this case, computer system 100 of FIG. 3 is powered down and in the sleep mode.

In step 620 of FIG. 6, both +5V primary power 330 and +5V auxiliary power 302 are available.

In step 625, from step 610, first circuit assembly 310 (FIG. 3) selects +5V primary power 330 to power ASIC 320 (FIG. 3) as described above in conjunction with FIG. 4.

In step 630, from step 615 or step 620, first circuit assembly 310 selects +5V auxiliary power 330 to power ASIC 320 as described above in conjunction with FIG. 4 in accordance with one embodiment of the present invention.

Thus, at this point in process 600, a single +5V power source is selected in accordance with the present embodiment of the present invention. In step 632, voltage regulator 520 (FIG. 5) steps down the voltage from +5V to +3.3V.

Starting with step 635 of FIG. 6, in accordance with the present embodiment, power will be selectively conducted from either +3.3V power from voltage regulator 520 or +3.3V auxiliary power 332 (FIG. 3).

In step 640 of FIG. 6, only +3.3V power from voltage regulator 520 is available. In this case, NIC 118 is not compliant with revision 2.2 of the PCI specification.

In step 645 of FIG. 6, both +3.3V power from voltage regulator 520 and +3.3V auxiliary power 332 are available.

In step 650 of FIG. 6, only +3.3V auxiliary power 332 is available. In this case, computer system 100 of FIG. 3 is powered down and in the sleep mode, and NIC 118 does not have the remote wakeup function through connector 300 (FIG. 3). Alternatively, connector 300 is not plugged in but can still operate in remote wakeup mode through bus 102 (FIG. 3).

In step 655, from step 640 or step 645, second circuit assembly 312 (FIG. 3) selects +3.3V power from voltage regulator 520 to power ASIC 320, EEPROM 322, and boot ROM 324 (FIG. 3) as described above in conjunction with FIG. 5 in accordance with one embodiment of the present invention.

In step 660, from step 650, second circuit assembly 312 selects +3.3V auxiliary power 332 to power ASIC 320 as described above in conjunction with FIG. 5.

In accordance with one embodiment of the present invention, the power source selected as a function of the available power sources connected to NIC 118 (FIG. 3) is summarized by Table 1 for process 600. Table 1 illustrates that a potential power contention issue exists for cases 3, 5, 7 and 8 because multiple power sources may be used; however, in accordance with the present invention, a single power source is selected and so the power contention issue is satisfactorily addressed.

TABLE 1

Exemplary Power Source Arbitration

| Case | Power On? | PCI 2.1 Compliant? | PCI 2.2 Compliant? | +5 V Primary Available? | +5 V Auxiliary Available? | +3.3 V Auxiliary Available? | Power Source Used (3) |
|---|---|---|---|---|---|---|---|
| 1 | Y | N | N | Y | N | N | +5 V Primary |
| 2 | N | N | N | N | N | N | None |
| 3 | Y | Y | N | Y (1) | Y (1) | N | +5 V Auxiliary |
| 4 | N | Y | N | N | Y | N | +5 V Auxiliary |
| 5 | Y | N | Y | Y (2) | N | Y (2) | +5 V Primary |
| 6 | N | N | Y | N | N | Y | +3.3 V Auxiliary |
| 7 | Y | Y | Y | Y (3) | Y (3) | Y | +5 V Auxiliary |
| 8 | N | Y | Y | N | Y (2) | Y (2) | +5 V Auxiliary |

Table 1 Notes:
(1) As described in conjunction with FIG. 4, when both +5 V primary power and +5 V auxiliary power are available, +5 V auxiliary power is selected in accordance with one embodiment of the present invention.
(2) As described in conjunction with FIG. 5, when both a +5 V power source and +3.3 V auxiliary power are available, the +5 V power source is selected in accordance with one embodiment of the present invention.
(3) As described in conjunction with FIG. 5, the +5 V power sources are in actuality stepped down to +3.3 V by voltage regulator 520 in accordance with one embodiment of the present invention.

In summary, the present invention provides a device and method thereof which address the power contention problem so that components do not inadvertently receive power from more than one source when multiple power sources are present in a peripheral device (such as a network interface card). The present invention also provides a device and method thereof that allow the peripheral device to select one power source versus another depending on the mode in which the computer and peripheral device are currently operating (e.g., sleep mode versus awake). The present invention can be used with devices that have the remote wakeup cable function per PCI 2.1, and also with devices that are compliant PCI 2.2. However, the present invention can also be used with legacy devices that do not have the remote wakeup function or are not compliant with revision 2.2 of the PCI specification. The present invention can also be used with different numbers of power sources having different voltages than those discussed herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. In a computer system peripheral device connected to multiple power sources, a circuit for arbitrating between a first power source and a second power source, said circuit comprising:

a first component coupled between said first power source and said second power source, said first component adapted to conduct current from said second power source when power is not available from said first power source, wherein said first power source is selected from a primary power source connected to said peripheral device and a first auxiliary power source connected to said peripheral device, and wherein said second power source is a second auxiliary power source connected to said peripheral device;

a second component integral with said first component, wherein said second component is adapted to conduct current from said second power source in combination with said first component and to substantially prevent current from flowing from said first power source to said second power source;

a third component coupled between said first power source and said second power source, wherein said third component is adapted to regulate voltage such that a voltage from said first power source and a voltage from said second power source are approximately equal;

a fourth component coupled between said primary power source and said first auxiliary power source, said fourth component adapted to conduct current from said primary power source when said first auxiliary power source is not available and to otherwise conduct power from said first auxiliary power source; and a fifth component integral with said fourth component, wherein said fifth component is adapted to conduct current from said primary power source in combination with said fourth component and to substantially prevent current from flowing from said first auxiliary power source to said primary power source.

2. The circuit of claim 1 wherein said first component is a field effect transistor.

3. The circuit of claim 1 wherein said second component is a diode.

4. The circuit of claim 1 wherein said fourth component is a transistor and said fifth component is a diode.

5. The circuit of claim 1 wherein said primary power source is connected to said peripheral device via a PCI (peripheral component interconnect) bus and said first auxiliary power source is connected to said peripheral device via a cable that provides a remote wakeup function.

6. The circuit of claim 5 wherein said second auxiliary power source is connected to said peripheral device via a PCI bus in accordance with PCI standard 2.2.

7. The circuit of claim 1 wherein said peripheral device is a network adapter.

8. In a computer system peripheral device connected to multiple power sources, a method for arbitrating between a first power source and a second power source, said method comprising the steps of:

a) selecting said first power source from a primary power source connected to said peripheral device and a first auxiliary power source connected to said peripheral device, wherein power from said first auxiliary power source is conducted when power is available from said first auxiliary power source, and otherwise power from said primary power source is conducted;

b) selectively conducting current from said second power source using a first component coupled between said first power source and said second power source;

c) conducting current from said second power source and substantially preventing current from flowing to said second power source from said first power source using a second component integral with said first component; and d) regulating voltage using a third component coupled between said first power source and said second power source;

wherein power is conducted from said first power source when power is available from said first power source, and otherwise power is conducted from said second power source.

9. The method for arbitrating between a first power source and a second power source as recited in claim 8 wherein said first component is a field effect transistor.

10. The method for arbitrating between a first power source and a second power source as recited in claim 8 wherein said second component is a diode.

11. The method for arbitrating between a first power source and a second power source as recited in claim 8 wherein step a) further comprises the steps of:

a1) selectively conducting current from said primary power source using a fourth component coupled between said primary power source and said first auxiliary power source; and a2) conducting current from said primary power source and substantially preventing current from flowing from said first auxiliary power source to said primary power source using a fifth component integral with said fourth component.

12. The method for arbitrating between a first power source and a second power source as recited in claim 11 wherein said fourth component is a transistor and said fifth component is a diode.

13. The method for arbitrating between a first power source and a second power source as recited in claim 8 wherein said primary power source is connected to said peripheral device via a PCI (peripheral component interconnect) bus and said first auxiliary power source is connected to said peripheral device via a cable that provides a remote wakeup function.

14. The method for arbitrating between a first power source and a second power source as recited in claim 13 wherein said second auxiliary power source is connected to said peripheral device via a PCI bus in accordance with PCI standard 2.2.

15. The method for arbitrating between a first power source and a second power source as recited in claim 8 wherein said peripheral device is a network adapter.

16. In a computer system peripheral device connected to a plurality of power sources, a circuit for arbitrating between a primary power source, a first auxiliary power source and a second auxiliary power source, said circuit comprising:

a first circuit subassembly coupled to said primary power source and said first auxiliary power source, said first circuit subassembly comprising:
      a first transistor coupled between said primary power source and said first auxiliary power source, said first transistor adapted to conduct current from said primary power source; and
      a first diode integral with said first transistor, wherein said first diode is adapted to conduct current from said primary power source in combination with said first transistor and to substantially prevent current from flowing from said first auxiliary power source to said primary power source;
      wherein said first circuit subassembly conducts power from said first auxiliary power source when power is available from said first auxiliary power source and otherwise conducts power from said primary power source;

a second circuit subassembly coupled to said first circuit subassembly and said second auxiliary power source, said second circuit assembly comprising:
      a second transistor coupled to said second auxiliary power source, said second transistor adapted to conduct current from said second auxiliary power source when power is not available from said first circuit subassembly; and
      a second diode integral with said second transistor, wherein said second diode is adapted to conduct current from said second auxiliary power source in combination with said second transistor and to substantially prevent current from flowing from said first circuit subassembly to said second auxiliary power source; and a voltage regulator coupled between said first circuit subassembly and said second circuit subassembly.

17. The circuit of claim 16 wherein said primary power source is connected to said peripheral device via a PCI (peripheral component interconnect) bus and said first auxiliary power source is connected to said peripheral device via a cable that provides a remote wakeup function.

18. The circuit of claim 16 wherein said second auxiliary power source is connected to said peripheral device via a PCI bus in accordance with PCI standard 2.2.

19. The circuit of claim 16 wherein said peripheral device is a network adapter.

* * * * *